April 4, 1967 U. KNIPP ET AL 3,312,666
POLYURETHANE POLYMERS
Filed May 22, 1963 2 Sheets-Sheet 1
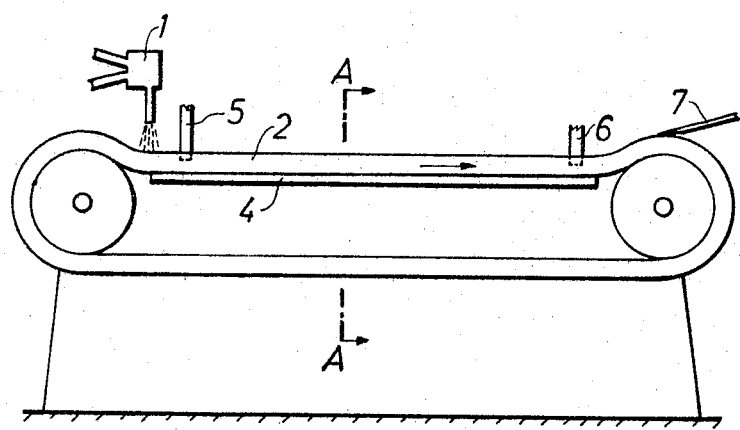
FIG. I
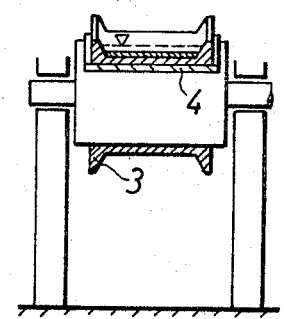
FIG. Ia
INVENTORS:
ULRICH KNIPP, ALBERT AWATER, WALTER OETKE, ERWIN
WEINBRENNER, HEINRICH SCHÖNZELER.
BY
ATTORNEY April 4, 1967  U. KNIPP ET AL  3,312,666
POLYURETHANE POLYMERS
Filed May 22, 1963  2 Sheets-Sheet 2
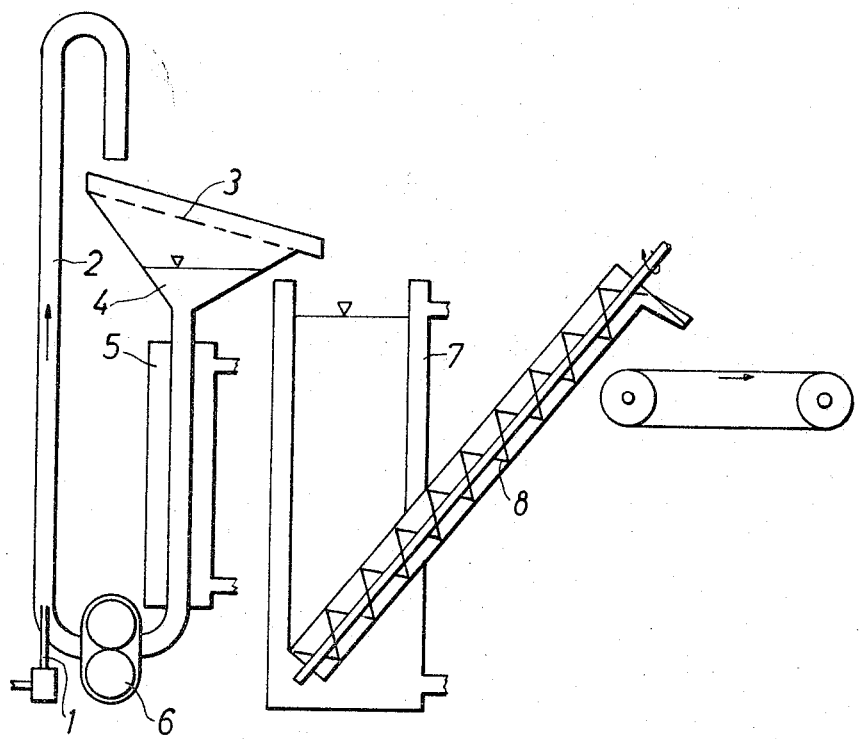
FIG. II
INVENTORS:
ULRICH KNIPP, ALBERT AWATER, WALTER OETKE, ERWIN
WEINBRENNER, HEINRICH SCHONZELER.
ATTORNEY United States Patent Office 3,312,666
Patented Apr. 4, 1967

3,312,666
POLYURETHANE POLYMERS
Ulrich Knipp, Leverkusen, Albert Awater, Cologne-Mulheim, Walter Oetke, Leverkusen, Erwin Weinbrenner, Opladen, and Heinrich Schönzeler, Leverkusen, Germany, assignors to Farbenfabriken Bayer Aktiengesellschaft, Leverkusen, Germany, a German corporation
Filed May 22, 1963, Ser. No. 282,287
Claims priority, application Germany, June 1, 1962, F 36,954
10 Claims. (Cl. 260—75)

This invention relates to polyurethane polymers and a method of preparing the same. More particularly it relates to polyurethane polymers capable of being fabricated by thermoplastic techniques.

It has been heretofore known to prepare polyurethane polymers processable by thermoplastic techniques by reacting polyhydroxyl compounds and polyisocyanates and in some cases, chain extending agents in definite proportions and under controlled conditions. This is achieved by interrupting the isocyanate polyaddition reaction and particularly the cross-linking reaction at a stage when the material is plastically deformable and to subsequently carry out the final cross-linking during the molding or shaping process. By this technique, polyurethane polymers can be shaped by methods typically used with relation to thermoplastic synethetic materials such as, for example, spray casting, extruding, injection molding, compression molding, blow molding, welding and the like.

The difficulty of such a process lies in conducting the polyaddition reaction in such a manner, while observing very accurate temperature conditions, that a homogeneous mass which has a very narrow spectrum for the isocyanate consumption curve per unit volume is obtained when the reaction is broken off, and a reduction in the NCO content due to unwanted side reactions must be avoided.

Thermoplastically processable polyurethanes have been prepared heretoforce by mixing the reactive components, pouring this mixture onto plates or bands which are conveyed through furnaces, cooling the material in a dry stream of cold air and then granulating the material for further use. This technique suffers serious disadvantages in that the material while still liquid adheres firmly to the plates or bands, thus necessitating a constant treatment with a separaing or mold release agent. This introduces an additional problem because the separating agent adheres to the thermoplastic mass of polyurethanes and interferes with subsequent processing.

Another and even more serious disadvantage is that the reactive components used in the preparation of the polyurethane continue to react in different ways and at different rates so the resulting mass differs widely and leads to disturbances in the thermoplastic treatment. Thus, for example, the reaction rate is different in the center of the mass of polyurethane present on the plates or bands than those at the surface next to the plate or band and also at the surface exposed to air. In addition to the different reactivity which is caused by the difficulty of controlling the temperature across the entire cross-section due to the poor thermal conductivity of the synthetic material itself, a further disadvantage of side reactions on the surfaces of the material due to atmospheric oxygen or moisture in the air is present. The consequences of these disadvantages become apparent subsequently in the fabrication of the finished article in that, what appears to be gel particles are present on the surface of the finished article itself. These gel particles are attributed to more highly cross-linked centers in the reaction mass which are less thermoplastic than the remaining body of the material.

It is therefore an object of this invention to provide polyurethane polymers not subject to the heretofore stated disadvantages. It is another object of this invention to provide an improved method of manufacturing thermoplastically processable polyurethane polymers. It is still another object of this invention to provide an improved method of preparing thermoplastically processable polyurethane polymers, which reduces the possibility of side reactions. It is a further object of this invention to provide substantially homogeneous thermoplastically processable polyurethane polymers.

The foregoing objects and others, which will become apparent from the following description and the accompanying drawings in which:

FIGURE I is a diagrammatic side elevation of one embodiment of an apparatus suitable for conducting the process in accordance with this invention;

FIGURE Ia is a sectional view taken along the line A—A of FIGURE I; and

FIGURE II is a side elevation of another embodiment of an apparatus suitable for conducting the process in accordance with this invention;
are accomplished in accordance with this invention, generally speaking, by providing thermoplastically processable polyurethane polymers prepared by intimately mixing the reaction components of a polyurethane plastic, introducing this mixture into a heated inert liquid wherein solidification occurs and in which the reactive components and the polyurethane polymers are substantially insoluble and separating the solidified product from the inert liquid. Thus, the invention contemplates a mixing step wherein the reactive components of a polyurethane polymer are intimately combined, a reaction step which is controlled by the environment surrounding the reactants, the environment being a liquid which is inert and in which the reactants and the product are substantially insoluble and a separation step wherein the product is separated from the inert liquid. In many instances, it is desirable to add a chilling step to the process. This can be accomplished by passing the separated polymer through an inert liquid maintained at a lower temperature.

In one embodiment in the process in accordance with this invention the reaction components or intermediates prepared from the reaction components can be introduced into the top of a tube filled with a heated insert liquid which is of lower specific gravity than the reaction material. The solidified product can then be removed from the bottom of the tube in a state of plasticity which can be varied as desired by altering the variables involved in the process. The variables which can be changed are the length of the tube, the viscosity, the specific gravity and the temperature of the inert liquid. Thus, in this embodiment the reactive components continue to react as they descend through the inert liquid until solidification to the desired degree results. At this point, the product is separated from the liquid.

In an alternative procedure the reaction components can be introduced into the bottom of a tube filled with an inert liquid having higher specific gravity than the reaction material. In this instance, the reaction continues as the components ascend through the inert liquid. When the desired degree of reaction is reached, the solidified polyurethane polymer is separated from the inert liquid. The same variables can be adjusted in this procedure as those set forth in the process described immediately above.

In still another embodiment of the method in accordance with the invention the reaction components can be introduced into the center of a heated, laminar current of inert liquid, from which it is removed when the desired degree of reaction has been reached. Thus, in addition to the above-described freely selectable degrees of freedom to determine the form of the solid body of the solidified polyurethane polymer the velocities or flow of the two media can be varied, thereby determining the residence time of the reaction components within the inert liquid. It is preferred that the inert liquid into which the reaction components are introduced is substantially free of turbulence.

In accordance with this invention it is essential that the inert liquid is not reactive with the reaction components used in the preparation of the polyurethane polymers or undergo any decomposition or chemical changes at the temperatures required. In addition, the inert liquid should have substantially no solubilizing or swelling action on either the individual starting components, intermediate reaction products or the thermoplastic polyurethane polymer thus formed. It is further advantageous that the inert liquid exhibit substantially no tendency to adhere to the surface of the thermoplastic product. This facilitates the removal of the inert liquid from the product by brief washing steps.

As stated previously, in many instances it is advantageous that the reaction product, after removal from the inert liquid be chilled briefly in a second liquid bath. This liquid preferably is a low boiling liquid inert with respect to the product and which exhibits at least only a slight swelling effect on the polyurethane polymer. This liquid preferably has a boiling point less than about 100° C. to facilitate its ready removal from the solid polymer. This chilling step not only is advantageous from the standpoint of interrupting the polyaddition reaction but can also be useful in removing any inert solvent which is present on the surface of the polyurethane plastic polymers.

Any suitable inert liquid may be used to control the polyaddition reaction as long as it possesses the features set forth above such as, for example, aliphatic hydrocarbons including benzines, mineral spirits having a boiling point of from about 160 to about 190° C., kerosene having a boiling point of from about 150° to about 280° C., petroleum having a boiling point of from about 150° to about 300° C., paraffin oil having a boiling point above 300° C., Stoddard solvent, and the like, silicone oils such as, for example, dimethyl polysiloxanes being liquid at about 100° C., for instance a dimethylpolysiloxane with a viscosity of 104 centistokes at 20° C., further a methylphenylpolysiloxane being liquid at about 80–130° C. and the like, low melting point metal compounds or alloys such as, for example, Woods metal, mercury, Rose metal, Newton's alloy, Lipowitz alloy and the like.

The temperature at which the inert liquid is maintained for conducting the polyaddition reaction depends in each case upon the types of reaction components used and the other degrees of freedom of the process. However, it is preferred that inert liquid be maintained at a temperature of from about 70° to about 170° C. The inert liquid preferably has a specific gravity of from about 0.7 to about 13 grams per cubic centimeter and the viscosity preferably should be within the range of from about 1 to about 1000 centistokes.

If a chilling step is desired, any suitable liquid having the particular qualities set forth above may be used, such as, for example, petroleum ether, carbon tetrachloride, benzine, ethylene trichloride, benzene, xylene, acetone, ethyl acetate and the like. While the temperature of the chilling solution can be varied over wide ranges, it is preferred that it be maintained at a temperature from about 10 to about 70° C.

The term "solidification" as used herein to designate the point when the material is ready to be removed from the liquid is intended to describe a state wherein the product will no longer be deformed without external pressure, in other words, it will from the point of "solidification" onwards hold its dimensional shape.

The reaction components which solidify in the inert liquid to form a thermoplastically processable polyurethane polymer consist of two or more liquid, molten or dissolved starting materials or preliminary adducts obtained from the starting materials which are introduced into the inert liquid after or simultaneously with an intensive stirring process. This stirring or mixing process can be achieved by suitable mixing devices such as, for example, that disclosed in U.S. Reissue Patent 24,514.

In the preparation of the thermoplastic polyurethane polymers an organic compound containing active hydrogen atoms which are reactive with NCO groups is intimately mixed with an organic polyisocyanate and if desired, a chain extending agent and this reaction mixture is introduced into the inert liquid in the process heretofore set forth.

Any suitable organic compound containing active hydrogen atoms which are reactive with NCO groups such as, for example, hydroxyl polyesters, polyhydric polyalkylene ethers, polyhydric polythioethers, polyacetals and the like may be used.

Any suitable hydroxyl polyester may be used such as, for example, the reaction product of a polycarboxylic acid and a polyhydric alcohol. Any suitable polycarboxylic acid may be used in the preparation of the hydroxyl polyester such as, for example, adipic acid, succinic acid, sebacic acid, suberic acid, oxalic acid, methyl adipic acid, glutaric acid, pimelic acid, azelaic acid, phthalic acid, terephthalic acid, isophthalic acid, thiodipropionic acid, maleic acid, fumaric acid, citraconic acid, itaconic acid and the like. Any suitable polyhydric alcohol may be used in the reaction with the polycarboxylic acid to form a polyester such as, for example, ethylene glycol, propylene glycol, butylene glycol, neopentyl glycol amylene glycol, hexanediol, bis-(hydroxymethylcyclohexane) and the like. Of course, the hydroxyl polyester may contain urethane groups, urea groups, amide groups, chalkogen groups and the like. Thus, the hydroxyl terminated polyester includes, in addition to hydroxyl terminated polyesters, also hydroxyl terminated polyester amides, polyester urethanes, polyetheresters and the like. Any suitable polyester amide may be used such as, for example, the reaction product of a diamine or an amino alcohol with any of the compositions set forth for preparing polyesters. Any suitable amine may be used such as, for example, ethylene diamine, propylene diamine, tolylene diamine and the like. Any suitable amino alcohol such as, for example, β-hydroxy ethyl-amine and the like may be used. Any suitable polyester urethane may be used such as, for example, the reaction of any of the above-mentioned polyesters or polyester amides with a deficiency of an organic polyisocyanate to produce a compound having terminal hydroxyl groups. Any of the polyisocyanates set forth hereinafter may be used to prepare such compounds.

Any suitable polyetherester may be used as the organic compound containing terminal hydroxyl groups such as, for example, the reaction product of an ether glycol and a polycarboxylic acid such as those mentioned above, with relation to the preparation of polyesters. Any suitable ether glycol may be used such as, for example, diethylene glycol, triethylene glycol, 1,4-phenylene-bis-hydroxy ethyl ether, 2,2'-diphenyl propane 4,4'-bis-hydroxy ethyl ether and the like.

Any suitable polyhydric polyalkylene ether may be used such as, for example, the condensation product of an alkylene oxide with a small amount of a compound containing active hydrogen containing groups such as, for example, water, ethylene glycol, propylene glycol, butylene glycol, amylene glycol, trimethylol propane, glycerine, pentaerythritol, hexanetriol and the like. Any suitable alkylene oxide condensate may also be used such as, for example, the condensates of ethylene oxide, propylene oxide, butylene oxide, amylene oxide and mixtures thereof. The polyalkylene ethers prepared from tetrahydrofuran may be used. The polyhydric polyalkylene ethers may be prepared by any known process such as, for example, the process described by Wurtz in 1859 and in the "Encyclopedia of Chemical Technology," volume 7, pages 257–262, published by Interscience Publishers in 1951 or in U.S. Patent 1,922,459.

Any suitable polyhydric polythioether may be used such as, for example, the reaction product of one of the aforementioned alkylene oxides used in the preparation of the polyhydric polyalkylene ether with a polyhydric thioether such as, for example, thiodiglycol, 3,3'-dihydroxy propyl sulfide, 4,4'-dihydroxy butyl sulfide, 1,4-($\beta$-hydroxy ethyl)phenylene dithioether and the like.

Any suitable polyacetal may be used such as, for example, the reaction product of an aldehyde with a polyhydric alcohol. Any suitable aldehyde may be used such as, for example, formaldehyde, paraldehyde, butyraldehyde and the ilke. Any of the polyhydric alcohols mentioned above with relation to the preparation of hydroxyl polyesters may be used.

The organic compound containing active hydrogen atoms should preferably be substantially linear or only slightly branched and have a molecular weight of at least about 800 and for best results, a molecular weight of from about 1800 to about 3000, an hydroxyl number of from about 75 to about 35 and an acid number less than about 2.

Any suitable organic diisocyanate may be used in reaction with the organic compound containing active hydrogen atoms to produce thermoplastically processable polyurethane polymers such as, for example, ethylene diisocyanate, ethylidene diisocyanate, propylene diisocyanate, butylene diisocyanate, hexamethylene diisocyanate, cyclopentylene-1,3-diisocyanate, cyclohexylene-1,4-diisocyanate, cyclohexylene-1,2-diisocyanate, 2,4-toluylene diisocyanate, 2,6-toluylene diisocyanate, dimeric toluylene diisocyanate, 4,4'-diphenylmethane diisocyanate, 2,2-diphenylpropane-4,4'-diisocyanate, p-phenylene diisocyanate, m-phenylene diisocyanate, xylylene diisocyanate, 1,4-naphthylene diisocyanate, 1,5-naphthylene diisocyanate, diphenyl-4,4'-diisocyanate, azobenzene-4,4'-diisocyanate, diphenylsulphone-4,4'-diisocyanate, dichlorohexamethylene diisocyanate, furfurylidene diisocyanate, 1-chlorobenzene-2,4-diisocyanate and the like. It is preferred that aromatic diisocyanates be used and for best results, 4,4'-diphenylmethane diisocyanate or toluylene diisocyanate have proven to be especially suitable.

Any suitable chain extending agent containing active hydrogen atoms which are reactive with NCO groups and having a molecular weight less than about 500 may be used such as, for example, ethylene glycol, propylene glycol, butylene glycol, 1,4-butanediol, butenediol, butynediol, xylylene glycol, amylene glycol, neopentyl glycol, 2,3-butanediol, 1,4-phenylene-bis-($\beta$-hydroxy ethyl ether), 1,3-phenylene-bis-($\beta$-hydroxy ethyl ether), bis-(hydroxy methyl-cyclohexane), hexanediol, diethylene glycol, dipropylene glycol and the like; polyamines such as, for example, ethylene diamine, propylene diamine, butylene diamine, hexamethylene diamine, cyclohexylene diamine, phenylene diamine, tolylene diamine, xylylene diamine, 3,3'-dichlorobenzidene, 3,3'-dinitrobenzidene, 4,4'-methylene-bis(2-chloroaniline), 3,3-dichloro-4,4'-biphenyl diamine, 2,6-diamino pyridine, 4,4'-diamino diphenyl methane, and the like; alkanol amines such as, for example, ethanol amine, aminopropyl alcohol, 2,2-dimethyl propanol amine, 3-amino cyclohexyl alcohol, p-amino benzyl alcohol and the like; water, hydrazine, substituted hydrazines such as, for example, N,N'-dimethyl hydrazine, 1,6-hexamethylene-bis-hydrazine, carbodihydrazide, hydrazides of dicarboxylic acids and disulfonic acids such as adipic acid dihydrazide, oxalic acid dihydrazide, isophthalic acid dihydrazide, thiodipropionic acid dihydrazide, tartaric acid dihydrazide, 1,3-phenylene-disulfonic acid dihydrazide, omega-amino-capronic acid dihydrazide, gamma-hydroxy butyric hydrazide, bis-semi-carbazide, bis-hydrazine carbonic esters of glycols such as many of the glycols heretofore mentioned and the like.

In order to obtain a homogeneous mixture of the reaction components when the reaction components are not readily miscible and to thereby obtain a high velocity, additives such as emulsifiers, retarding agents, stabilizers, dyestuffs and the like may be introduced into the reaction mixture either separately or by first dissolving in one of the components.

The individual reaction components and the proportion in which they are added can be chosen according to the basic properties desired of the end product. However, it is preferred that the isocyanate be present in an amount at least sufficient to react with all of the active hydrogen atoms present and particularly in an amount such that a slight excess is present based on the active hydrogen atoms present in other reaction components. For best results, it is preferred that the isocyanate be present in an amount such that the NCO to OH ratio is from about 1.0 to about 1.2.

In the preparation of the reactive mixture which is introduced into the inert liquid, any order of addition of the reactive components can be used. For example, a portion of the reaction components may be allowed to react first and then this intermediate adduct can be mixed with the remainder of the reactants and then introduced into the inert liquid. Also, all of the reactants can be simultaneously mixed and introduced into the inert liquid.

In one particular method in carrying out the process in accordance with this invention, the reaction components or preliminary adducts obtained therefrom are placed on a horizontal or inclined base which is kept in motion in an inert heated liquid. This moving base which is limited laterally may be a trough shaped endless conveyor belt which receives both the reaction mixture and the inert heating liquid. Alternatively, a laterally limited band charged with the reaction mixture may run through a bath which is filled with an inert heating liquid. The surface of the plate in contact with the reaction mixture may be profiled according to the desired form of the solid thermoplastic mass.

This particular method combines the advantages of having accuracy of dwell, i.e. residence time which may be kept under observation and adjusted without tolerances of a conveyor band process, with the possibility of controlling the temperature very accurately and excluding air and moisture by means of an inert liquid.

Generally speaking, the process according to the invention produces an absolutely homogeneous end product. This is due mainly to the fact that the process insures a very narrow spectrum of duration of dwell in the heated liquid. To this is added the fact that the temperature can be controlled very accurately with this liquid. Another very important factor is that the effect of air and moisture, which are known to produce undesirable side reactions, can be completely eliminated. It has unexpectedly been found that in the process according to the invention, in contrast to the methods previously used, there is no adherence of solidifying materials to the walls of the apparatus even after a long time. Consequently, there are no impurities in the finished product.

Owing to the fact that the temperature, specific gravity, viscosity and in some cases the velocity of the carrier liquid may be varied as described above, solid articles of various forms, such as pearls, flakes or threads may be produced. This makes it possible to dispense with the granulating apparatus hitherto necessary. In general, the process according to the invention is distinguished by the fact that very simple apparatus may be used, and only a very short time is required to reach the steady state once the apparatus is set in operation, and the rate of production may be regulated as desired by adjusting the velocity of flow.

It has also been found that the thermoplastically deformable synthetic materials produced in accordance with the invention do not require a preliminary drying stage before they are formed, and they can be processed within a wide temperature range. The finished products have greater mechanical strength and less permanent elongation.

Referring specifically to the drawing wherein FIGURE I and Ia illustrate an apparatus suitable for conducting the process in accordance with this invention, a suitable mixing device 1 which may be a device such as that described in Reissue Patent 24,514 is disposed above a movable conveyor 2 having a trough shaped cross-sectional configuration provided by sides 3 as shown in FIGURE Ia. The trough shaped conveyor band 2 passes over and is supported by a sliding plate member 4. An inlet 5 and an outlet 6 is provided downstream of the mixing device 1 for the introduction and removal of a suitable inert liquid. The conveyor 2 turns clockwise. As it passes beneath the mixing device 1, a reaction mixture is deposited onto the conveyor band 2. During this time an inert liquid is deposited onto the band 2 through the inlet 5. The reaction mixture together with the inert liquid then is moved by the conveyor band 2 during which time the reaction of the components previously intimately mixed in the device 1 takes place. The rate at which the conveyor drive wheels turn and the temperature at which the inert liquid is maintained is controlled in order to provide such reaction along the path of the conveyor to remove the product as a solid 7. As the conveyor 2 moves beneath the outlet 6, the inert liquid is withdrawn from the trough-like band 2.

In another embodiment illustrated in FIGURE II, an inert liquid is disposed within the system defined by funnel 4, heat exchanger 5, gear pump 6 and conduit 2. This inert liquid is maintained in motion around the system in a clockwise direction by means of gear pump 6. Disposed on the outlet side of gear pump 6 is a mixing device 1 together with a means for introducing the reaction mixture into a conduit 2. As the inert liquid together with the reaction mixture rises in conduit 2, reaction continues and solidification of the thermoplastically processable polyurethane polymer results. The conduit 2 discharges into the funnel 4 equipped with an inclined screen 3. The inert liquid passes through the screen and the polymer in the form of pearl granules roll over the inclined screen 3 into a cooling container 7 filled with a second liquid as previously defined. The granules pass down through the liquid in container 7 and are discharged therefrom by a conveyor worm 8 or other suitable means. After evaporation of the cooling liquid which may be accomplished on the conveyor shown, the material is ready for thermoplastic treatment.

The thermoplastic polymers prepared in accordance with this invention may be fabricated by injection molding, extrusion, compression molding, calendaring and the like into various final objects such as, for example, ball joints, bushings, shoe soles and heels, shock absorbers, fibers such as spandex and the like.

The invention is further illustrated but not limited by the following examples in which parts are by weight unless otherwise specified.

*Example 1*

About 100 parts of a linear polyester of adipic acid and ethylene glycol having an hydroxyl number of 56 are reacted with about 80 parts of diphenylmethane-4,4'-diisocyanate at about 110° C. and then mixed continuously with about 23 parts of butanediol and applied to a conveyor band which runs through a bath filled with a silicone oil at about 90° C. After about 2 minutes, the band of polyurethane elastomers which has solidified on the conveyor band is continuously discharged from the bath of silicone oil and chilled in a bath of cooled carbon tetrachloride and freed from the silicone oil still adhering to it. When the product has been disintegrated, the granulate of thermoplastic polyurethane can be injection molded as described below.

It is not necessary to dry the product before it is molded even after it has been stored for four weeks at room temperature without exclusion of air.

Injecion moldings are accomplished in an injection molding machine wherein the temperature of the inlet is about 170° C. that of the cylinder about 180° C., the nozzle about 190° C. and the mold is cold. The flow spirals have lengths of 180 cm.+5 cm. even after repeated molding processes. Nozzle temperatures between about 180 and 220° C. do not affect the physical properties. The following values for the molded material are maintained under all these conditions, although a temperature treatment after molding was not carried out:

Tensile strength standard rod 1 _____1 kg./cm.² __ 615
Elongation at break standard rod 1 _____percent__ 570
Permanent elongation after 1 minute _____do____ 28
Resistance to further tearing according to Graves _____kg./cm.__ 135
Shore hardness D _____degrees__ 52

Extrusion of thin walled tubes shows that the material has uniformly good flow properties.

*Example for comparison.*—About 100 parts of a polyester prepared from adipic acid and ethylene glycol having an hydroxyl number of 56 are reacted with about 80 parts of diphenylmethane-4,4'-diisocyanate at about 110° C. and then mixed continuously with about 23 parts of butanediol and cast continuously on to a plate heated to about 90° C. After about 2 minutes, the plate of material thereby obtained is cooled to room temperature and then granulated. When a thin walled tube is extruded under the same operating conditions as in Example 1, the wall thickness of the product is uneven, due to the lack of homogeneity of the material. The flow spiral is obtained under the same conditions as in Example 1. The first article obtained by injection molding has a length of 150 cm., the first repeat injection produces an article of 135 cm., and the next article is 80 cm. long. Test samples obtained by injection molding at temperatures of about 170°, about 180° and about 190° C. as in Example 1 have the following optimum values:

Tensile strength of standard rod 1 _____kg./cm.² __ 368
Elongation at break of standard rod 1 ___percent__ 560
Permanent elongation after 1 minute _____do____ 57
Resistance to further tearing according to Graves kg./cm.__ 127
Shore hardness D _____degrees__ 52

In order to obtain a product free from blisters, the granulate must be dried before injection, even if used only 8 days after it has been produced. At temperatures above about 205° C., the material blisters and can no longer be injection molded satisfactorily.

*Example 2*

About 100 parts of an adipic acid-glycol polyester having an hydroxyl number of 56 are mixed with about 23 parts of butanediol and heated to about 120° C. This mixer 1 shown in FIGURE I and applied to an endless diphenylmethane-4,4'-diisocyanate at about 80° C. in a mixer 1 shown in FIGURE I and applied to an endless band 2 having a trough shaped cross-section 3. This trough shaped band which moves in the direction indicated slides over a support 4. A silicone oil heated to about 130° C. is supplied to and removed from the band through pipes 5 and 6. The reaction mixture is deposited on the base of the trough shaped band where it solidifies, and is removed in the form of the band 7 which is subjected to further processing. The trough shaped conveyor band is pressed on to the sliding plate 4 by means of supports (not shown).

*Example 3*

About 100 parts of a dried adipic acid-ethylene glycol polyester having an hydroxyl number of 56 and an acid number of 1 are reacted with about 60 parts of naphthalene-1,5-diisocyanate for about 15 minutes at about 130° C. and then continuously mixed with about 19 parts of butane-1,4-diol. This mixture is continuously charged on to the top of a 3 meter liquid column of commercial mineral spirits having a boiling point of 160–190° C. and heated to 130° C., at an outlet velocity of about 0.1 m./sec. The particles of solidified synthetic material sedimented at the bottom of the bottom of the column are removed from the mineral spirits by beakers or a conveyor worm, and after evaporation of the residual mineral spirits adhering to the solid, it is ready for thermoplastic molding by means of an injection molding or extrusion process.

*Example 4*

About 700 parts of a polythioether of thiodiglycol and triethylene glycol having an hydroxyl number of 53 are reacted at about 150° C. for about 10 minutes with about 350 parts of naphthalene-1,5-diisocyanate and then mixed continuously with about 112 parts of butanediol. The mixture is pumped into the bottom of a 5 meter column of liquid which is open at the top and consists of Woods metal heated to about 130° C. The product, which solidifies rapidly, is removed from an overflow and cooled in a current of dry air and is then ready for the thermoplastic process.

*Example 5*

About 23 parts of butane-1,4-diol are continuously added at about 150° C. to about 100 parts of a glycol-adipic acid polyester having an hydroxyl number of 56 and about 80 parts of diphenylmethane-4,4'-diisocyanate are also added continuously and introduced through a nozzle 1 into a silicone oil heated to about 140° C. which flows through a five meter pipe 2 as shown in FIGURE II. The reaction mixture solidifies in the liquid which is flowing at a rate of about 1.5 meters per minute and drops on to an inclined screen plate 3 in the form of pearl granules.

The silicone oil is kept in circulation through a funnel 4, a heat exchanger 5 and a gear wheel pump 6. The pearl granulate rolls over the inclined screen 3 into a cooled container 7 filled with petroleum ether and is discharged through a conveyor worm 8 and, after evaporation of the petroleum ether, it is ready for the thermoplastic treatment.

It is to be understood that any of the procedures set forth above together with any of the reaction components set forth above may be utilized in place of the particular ones specifically stated in the examples. For example, any of the organic compounds containing active hydrogen atoms, organic polyisocyanates or chain-extending agents set forth throughout the disclosure can be used in place of those set forth therein. Further, any inert liquid having the characteristics set forth above and any of the cooling liquids having the characteristics set forth above can be used in place of those used in the working examples.

Although the invention has been described in considerable detail for the purpose of illustraiton, it is to be understood that variations can be made by those skilled in the art without departing from the spirit of the invention and scope of the claims.

What is claimed is:

1. A method of preparing polyurethane polymers processable by thermoplastic techniques which comprises intimately mixing an organic compound containing active hydrogen atoms which are reactive with —NCO groups and selected from the group consisting of polyesters, polyethers, polythioethers and polyacetals and and organic diisocyanate, substantially immediately introducing said mixture into an inert liquid in which the reactive components and the resulting polyurethane polymer are substantially insoluble at operating temperatures, said inert liquid being heated to a temperature of from about 70° C. to about 170° C., maintaining said mixture within said inert liquid until solidification of said polymer occurs and separating said solidified product from said inert liquid.

2. The process of claim 1 wherein said inert liquid has a specific gravity of from about 0.7 to about 13 grams/cc and a viscosity of from about 1 to about 1000 centistokes.

3. The process of claim 1 wherein said inert heated liquid is a silicone oil.

4. The process of claim 1 wherein said inert heated liquid is an aliphatic hydrocarbon.

5. The process of claim 1 wherein said inert heated liquid is a low melting point metal.

6. A method of preparing polyurethane polymers processable by thermoplastic techniques which comprises intimately mixing an organic compound containing active hydrogen atoms which are reactive with —NCO groups and selected from the group consisting of polyesters, polyethers, polythioethers and polyacetals and an organic diisocyanate and a chain extending agent containing active hydrogen atoms which are reactive with NCO groups and having a molecular weight less than about 500, substantially immediately introducing said mixture into an inert liquid in which the reactive components and the resulting polyurethane polymer are substantially insoluble at operating temperatures, said inert liquid being heated to a temperature of from about 70° C. to about 170° C., maintaining said mixture within said inert liquid until solidification of said polymer occurs and separatng said solidified product from said inert liquid.

7. The process of claim 6 wherein the organic compound containing active hydrogen atoms is an hydroxyl polyester having a molecular weight of about 2000, the organic diisocyanate is 4,4'-diphenylmethane diisocyanate and the chain extending agent is a glycol.

8. The process of claim 6 wherein the organic compound containing active hydrogen atoms is a polyalkylene ether glycol and the organic diisocyanate is toluylene diisocyanate.

9. A method of preparing polyurethane polymers processable by thermoplastic techniques which comprises intimately mixing an organic compound containing active hydrogen atoms which are reactive with NCO groups and selected from the group consisting of polyesters, polyethers, polythioethers and polyacetals and an organic diisocyanate, substantially immediately introducting said mixture into an inert liquid in which the reactive components and the resulting polyurethane polymer are substantially insoluble at operating temperatures, said inert liquid being heated to a temperature of from about 70° C. to about 170° C., maintaining said mixture within said inert liquid until solidification of said polymer occurs, separating said solidified products from said inert liquid, passing said solidified product into a low boiling inert liquid, having a boiling point less than 100° C. and selected from the group consisting of petroleum ether, carbontetrachloride, benzine, ethylenetrichloride, benzene, xylene, acetone and ethyl acetate and evaporating said low boiling liquid from said product.

10. The process of claim 9 wherein said low boiling liquid has a boiling point of from 50° to about 100°.

References Cited by the Examiner
UNITED STATES PATENTS

| | | | |
|---|---|---|---|
| 2,923,598 | 2/1960 | Reis et al. | 264—203 |
| 3,012,008 | 12/1961 | Lister | 260—75 |
| 3,036,878 | 5/1962 | Polansky | 264—178 |
| 3,100,752 | 8/1963 | Dombrow | 260—34.2 |
| 3,125,540 | 3/1964 | Loew et al. | 260—2.5 |
| 3,233,025 | 2/1966 | Frye et al. | 264—176 |

LEON J. BERCOVITZ, *Primary Examiner.*
DONALD CZAJA, *Examiner.*
J. J. KLOCKO, G. W. RAUCHFUSS,
*Assistant Examiners.*